United States Patent [19]
Lapidus et al.

[11] 3,818,077
[45] June 18, 1974

[54] L-ASPARTIC ACID DERIVATIVES

[75] Inventors: Milton Lapidus, Rosemont; Marian M. McGettigan, Bryn Mawr, both of Pa.

[73] Assignee: American Home Products Corporation, New York, N.Y.

[22] Filed: Aug. 7, 1972

[21] Appl. No.: 278,514

Related U.S. Application Data

[62] Division of Ser. No. 81,533, Oct. 16, 1970, Pat. No. 3,725,453.

[52] U.S. Cl................ 260/501.11, 260/518 A
[51] Int. Cl........................... C07c 101/08
[58] Field of Search............... 260/501.11, 518 A

[56] References Cited
OTHER PUBLICATIONS

Weygand et al., Ber. Vol. 90, pages 1896–1905 (1957).

*Primary Examiner*—Leon Zitver
*Assistant Examiner*—Michael W. Glynn
*Attorney, Agent, or Firm*—David E. Frankhouser

[57] ABSTRACT

Disclosed herein are derivatives of L-aspartic acid which have utility as artificial sweetener agents. Also disclosed is a method for producing such derivatives.

2 Claims, No Drawings

L-ASPARTIC ACID DERIVATIVES

This is a division of application Ser. No. 81,533 filed Oct. 16, 1970 now U.S. Pat. No. 3,725,453.

BACKGROUND OF THE INVENTION.

This invention relates to new and useful L-aspartic acid derivatives and non-toxic pharmaceutically acceptable salts thereof. These compounds have utility as artificial sweetening agents.

Synthetic sweetening agents have an established function in lowering the intake of sugar by persons who, of necessity, must do so, i.e., diabetics. Further, the widespread occurrance of obesity as a medical problem has created a demand for sugar substitutes which may be used in providing diets of normal taste and lowered caloric value. However, very few substances available exhibit a sweet taste and are also acceptable to the consumer. Because of recent adverse publicity the cyclamates have diminished in importance as artificial sweeteners and the largest artificial sweetener in public use today is saccharin. However, saccharin has the disadvantage of creating a bitter aftertaste following use in substantial portions of the population. The attempt to find a new artificial sweetening agent, easily manufactured without the drawbacks of saccharin or the cyclamates has culminated in the present invention.

Although no valid theory exists for predicting sweetness of chemical compounds, Moncrieff (Moncrieff, R.W., "The Chemical Senses," L. Hill Ltd., London, 1951) has proposed some generalizations for sweeteners as follows: (1) polyhydroxy and polyhalogenated aliphatic compounds are generally sweet; (2) α-aminoacids are usually sweet, but the β or δ aminoacids are not, and the closer together the amino group and the carboxy group, the greater the sweetness; (3) on ascending a homologous series, taste changes from sweet to bitter, and taste and water solubility disappear simultaneously; (4) alkylation of an amino or amido group often gives a sweet tasting compound; (5) one nitro group in a molecule often gives a sweet taste; (6) some aldehydes are sweet, ketones are never sweet.

Over the years since 1879, the date of the discovery of saccharin, a limited number of compounds have been discovered to have sweetness. Very few of these sweet compounds have been found to be non-toxic, and acceptable to the food and drug industry. These compounds are of interest since they reflect the diversity of chemical structures having sweetness and in fact detract from the attempts to correlate sweetness with chemical configuration. For reviews of sweet chemical compounds, see Bottle, R. T., Manufacturing Chemist, 35, 60(1964); Verkade, P. E., Farmaco (Pavia) Ed. Sci., 23, 248 (1968).

In 1969, Mazur et al. (Mazur, R. H.; Schlatter, J. M.; and Goldkamp, A. H.; Journ. Am. Chem. Soc., 91, 2684, 1969), reported the pronounced sucrose-like taste of L-aspartyl-L-phenylalanine methyl ester (I). The requirement of absolute L-configuration was necessary for sweetness. Mazur et al. extended their

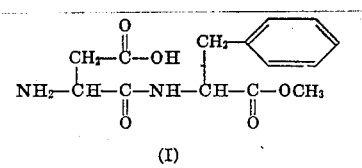

(I)

studies to include compounds (peptide esters) of Formula (II), wherein X was other amino acids of the L-configuration, Asp. is aspartyl. The nomenclature and abbreviations are according to IUPAC-IUP Commission in Biochemical Nomenclature, "Biochim. Biophys. Acta," 121, 1 (1966). When X is methionine or tyrosine the carboxyl group is β and equivalent sweetness was found.

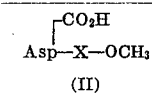

(II)

This activity was specific since substitution with other amino acids resulted in the loss of sweetness. If the aspartyl group was replaced by other amino acids (Y) the products, Formula (III) Phe—OCH₃ is phenylalanine methyl ester, were bitter to the taste $$Y-Phe-OCH_3$$

(III)

Also, β-carboxy peptides, Formula (IV) were bitter to the taste.

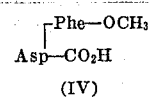

(IV)

Mazur et al. concludes that "the aspartic acid amino group had to be unsubstituted" and "an ester on the C-terminal carboxyl was required for sweetness." They further state that "If retention of sweetness is desired, changes in the aspartic acid part cannot be made, but there is room for substantial manipulation of the phenylalanine portion." As if to fulfill the prior art unpredictability of sweetness in chemical compounds and to further substantiate the potential problems in predicting chemical structure and sweetness, applicants have made their unobvious and unexpected discovery herein set forth.

SUMMARY

The present invention relates to novel compounds of the L-aspartic acid configuration having the formula:

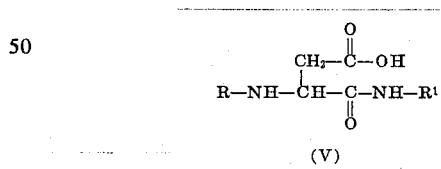

(V)

wherein R is hydrogen, trichloroacetyl or trifluoroacetyl; and R¹ is phenyl, p-chlorophenyl, p-fluorophenyl, p-bromophenyl, p-cyanophenyl, L-1-(lower)alkoxycarbonyl-2-phenethyl, L-1-(lower)-alkoxycarbonyl-2-(p-hydroxyphenyl)ethyl or L-1-(lower)alkoxycarbonyl-3-(methylthio)propyl, with the proviso that when R is hydrogen, R¹ is phenyl, p-chlorophenyl, p-fluorophenyl, p-bromo-phenyl or p-cyanophenyl; and the non-toxic pharmaceutically acceptable salts thereof. Included within the scope of the compounds of Formula (V) are compounds having the formula:

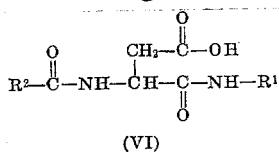

(VI)

wherein R¹ is as set forth previously; and R² is trichloromethyl or trifluoromethyl; and the salts thereof with non-toxic pharmaceutically acceptable bases. Of particular interest are the compounds of Formula (VI) identified as:

N-(L-α-carboxyphenethyl)-3-(2,2,2-trifluoroacetamido)-L-succinamic acid, N-methyl ester;

N-(L-α-carboxyphenethyl)-3-(2,2,2-trifluoroacetamido)-L-succinamic acid, N-methyl ester, dicyclohexylamine salt;

L-3-(2,2,2-trifluoroacetamido)succinanilic acid;

L-4'-chloro-3-(2,2,2-trifluoroacetamido)succinanilic acid;

L-4'-chloro-3-(2,2,2-trifluoroacetamido)succinanilic acid, dicyclohexylamine salt;

4'-fluoro-3-(2,2,2-trifluoroacetamido)-L-succinanilic acid;

4'-fluoro-3-(2,2,2-trifluoroacetamido)-L-succininilic acid, dicyclohexylamine salt;

L-4'-bromo-3-(2,2,2-trifluoroacetamido)succinanilic acid;

L-4'-cyano-3-(2,2,2-trifluoroacetamido)succinanilic acid;

L-4'-cyano-3-(2,2,2-trichloroacetamido)succinanilic acid.

Also included within the scope of the compounds of Formula (VI) are compounds having the formula:

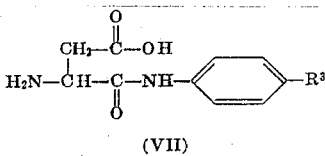

(VII)

wherein R³ is hydrogen, chloro, fluoro, bromo or cyano; and the non-toxic pharmaceutically acceptable salts thereof. Of particular interest are the compounds of Formula (VII) identified as:

L-3-amino-4'-chlorosuccinanilic acid;
L-3-amino-4'-cyanosuccinanilic acid.

When used herein and in the appended claims, the term "(lower)alkoxy" contemplates hydrocarbonoxy radicals, straight and branched chain, containing from about one to about six carbon atoms, and includes methoxy, ethoxy, n-propoxy, i-propoxy, n-butoxy, t-butoxy, n-pentoxy, n-hexoxy, 2-methylpentoxy, and the like. Non-toxic pharmaceutically acceptable salts include, for example, sodium, potassium, calcium, ammonium, cyclohexylamine, N,N'-dibenzylethylenediamine salts, and the like. All temperatures expressed herein are in degrees Centigrade, unless otherwise indicated.

The principal object of this invention is to provide novel L-aspartic acid derivatives and non-toxic pharmaceutically acceptable salts thereof which are useful as sugar substitutes or synthetic sweeteners. Very surprisingly, it has been found that the compounds of the present invention, Formula (V), exhibit a sweet taste without any accompanying bitter aftertaste and are non-toxic.

In the pharmacological evaluation of the compounds of this invention (Formula V), the toxicity was measured as follows:

The compound to be tested is administered intraperitoneally and/or orally to three mice (14 to 24 grams) at each of the following doses: 400, 127, 40 and 12.7 mg./kg. The animals are watched for a minimum of two hours, during which time signs of general stimulation (i.e., increased spontaneous motor activity, hyperactivity on tactile stimulation, twitching), general depression (i.e, decreased spontaneous motor activity, decreased respiration) and autonomic activity (i.e., miosis, mydriasis, diarrhea) are noted. The animals are tested for changes in reflexes (i.e., flexor, extensor) and are rated by use of a pole climb and inclined screen for the presence of sedation-ataxia. The "Eddy Hot-Plate Method" [Nathan B. Eddy and Dorothy Leimbach, J. Pharmacol. Exper. Therap. 107, 385 (1953)] is used to test for analgesia. The experiment is terminated by subjecting each animal to a maximal electroshock to test for anti-convulsant activity. The compounds of the present invention, when tested by the above procedure, demonstrated no oral toxicity at a level that prevented the following isosweetness test.

The quantitative evaluation of sweetness was based on comparing the compounds of the present invention (Formula V) with a standard solution of sucrose (0.06 M.). The test is for isosweetness and is based on one described by R. H. Mazur et al., "Structure-Taste Relationships of Sense Dipeptides," Journ. Am. Chem. Soc., 91:10, May 7, 1969. The test procedure is as follows: Test compounds were dissolved in water and adjusted to pH 7 with dilute sodium hydroxide. A cotton swab stick was soaked in the test solution and the compound was sucked off the swab and tasted by adult volunteers. Successive dilutions were made until approximately the same quantitative sweet taste of the test compound and standard sucrose solution (0.06 M) was obtained. Relative sweetness was calculated by dividing the molarity of the standard sucrose solution (0.06 M) by the molarity of the isosweet test solution. The compounds of this invention were surprisingly more sweet than sucrose by the above procedure. For example, L-4'-cyano-3-(2,2,2-tri-fluoroacetamido)succinanilic acid and L-4'-cyano-3-(2,2,2-tri-chloroacetamido)succinanilic acid, calcium salt were each about 3000 times as sweet as sucrose and L-4'-chloro-3-(2,2,2-trifluoroacetamido)succinanilic acid was about 120 times as sweet as sucrose.

The chemical structure necessary to provide a sweet taste is relatively specific. Table 1, following, sets forth the presence or absence of sweetness in series of related compounds. The presence of sweetness is indicated by a plus "+" whereas the absence of sweetness is indicated by a minus "—." Table 1 demonstrates the relatively narrow scope of the present invention in that structurally similar compounds do not possess a sweet taste. TABLE 1

TABLE 1

$$X-\overset{O}{\overset{\|}{C}}-NH-\overset{CH_2-\overset{O}{\overset{\|}{C}}-OH}{\underset{\|}{\overset{|}{CH}}-\overset{}{\underset{O}{C}}-NH-Y}$$

| X | Y | Sweet |
|---|---|---|
| $F_3C-$ | $-\langle\bigcirc\rangle$ | + |
| $F_3C-$ | $-CH_2-\langle\bigcirc\rangle$ | − |
| $F_3C-$ | $-H$ | − |
| $F_3C-$ | $-CH(CH_3)-CH_2-\langle\bigcirc\rangle$ | − |
| $F_3C-$ | $-CH(CH_2-\langle\bigcirc\rangle)-CO_2Me$ | + |
| $F_3C-$ | $-CH_2(CH_2)_4-CH_3$ | − |
| $F_3C-$ | $-\langle\bigcirc\rangle-SO_2NH_2$ | − |
| $F_3C-$ | $-\langle\bigcirc\rangle$ (cyclohexyl) | − |
| $F_3C-$ | $-\langle\bigcirc\rangle-F$ | + |
| $F_3C-$ | $-N\langle\bigcirc\rangle$ (pyridyl) | − |
| $F_3C-$ | $-\langle\bigcirc\rangle$ (cyclopentyl) | − |
| $F_3C-$ | $-\langle\bigcirc\rangle-Me$ | − |
| $F_3C-$ | $-\langle\bigcirc\rangle(Cl)$ (ortho) | − |
| $F_3C-$ | $-\langle\bigcirc\rangle-C(=O)OCH_2CH_3$ | − |
| $F_3C-$ | $-\langle\bigcirc\rangle-Cl$ | + |
| $F_3C-$ | $-\triangleleft$ (cyclopropyl) | − |
| $F_3C-$ | $-CH_2CH_2-\langle\bigcirc\rangle-OH$ | − |
| $F_2ClC-$ | $-\langle\bigcirc\rangle$ | − |
| $F_3C-$ | $-\triangleleft\langle\bigcirc\rangle$ (cyclopropyl-phenyl) | − |
| $F_3C-$ | $-\langle\bigcirc\rangle$ with F,F (difluoro) | − |
| $F_3C-$ | $-\langle\bigcirc\rangle$ with F,F | − |
| $F_3C-$ | F (different position) | − |
| $F_3C-$ | $CH_3-CH-(CH_2)_4-CH_3$ | − |
| $F_3C-$ | (bicyclic) | − |
| $F_3C-$ | $-\langle\bigcirc\rangle(CO_2H)-Cl$ | − |
| $F_3C-$ | $-\langle\bigcirc\rangle-Br$ | + |
| $H-$ | $-\langle\bigcirc\rangle-Cl$ | + |
| $F_3C-$ | $-\langle\bigcirc\rangle-CN$ | + |
| $Cl_3C-$ | Same as above | + |
| $H-$ | do | + |

The compounds of the present invention are useful wherever a sweet taste without caloric value is indicated. This would include comestibles such as food or medicines intended for human or animal consumption. Such items as soda, ice cream, coffee, tea and chewable medications would particularly lend themselves for use with compounds of the present invention. For example, when several drops of a 100 mg./cc. solution of L-4'-cyano-3-(2,2,2-trifluoroacetamido)succinanilic acid are added to iced tea or hot coffee, a sweet taste not unlike when sucrose sweetened is obtained. For example, when 2 mg. of L-4'-cyano-3-(2,2,2-trifluoroacetamido)succinanilic acid is added to 250 c.c. (one cup) of hot coffee with cream, the taste is indistinguishable from that of 5 g. of table sugar. Additionally, the compounds of this invention may be combined with other synthetic sweetening agents or with sugars to provide sweetening compositions.

The compounds of the present invention of the L-aspartic acid configuration having the formula:

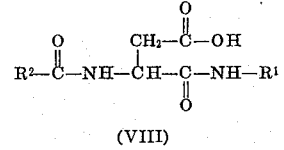

(VIII)

wherein $R^1$ and $R^2$ are as previously set forth, are provided by a process which comprises contacting an L-aspartic anhydride of the formula:

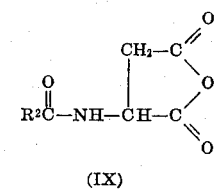

(IX)

wherein $R^2$ is as previously set forth, with a compound of the formula:

$$NH_2-R^1$$
(X)

wherein $R^1$ is as previously set forth until said compound of Formula (VIII) is provided. The contacting may take place at any temperature ranging from ambient room temperature (about 25°C.) up to the reflux temperature of the reactants. However, a temperature should be used that does not adversely affect the reactants. It has been found that the reaction proceeds favorably at room temperature when allowed to remain in contact from overnight up to about a week. It is also advisable to use a reaction inert organic solvent to dissolve the reactants. These reaction inert organic solvents would be those which dissolve the reactants but do not adversely affect the reaction or the reactants and include solvents such as tetrahydrofuran, dimethylsulfoxide, dimethylformamide, and so forth. The compound of Formula (VIII) is recovered by routine procedures, i.e., removing the solvent (as by vacuum distillation), washing with an acid (hydrochloric acid) and recrystallizing from an appropriate solvent (acetonitrile, n-butanol, methanol-isopropyl ether). If desired, salts of the compounds are provided by routine procedures.

The starting materials of Formula (X) are well known or provided by routine techniques readily available to those skilled in the art. The starting materials of Formula (IX) are also known and may be provided by reacting aspartic acid and the appropriate tri(halo)acetic anhydride in an ice bath. The compounds of Formula (V), wherein R is hydrogen, are provided from the equivalent compounds of Formula (VIII) by cleaving the tri(halo)acetyl in a base such as ammonium hydroxide with heating if necessary. The resulting 3-amino compounds are recovered by routine procedures.

The following examples are given by way of illustration and are not to be construed as limitations of this invention, many variations of which are possible without departing from the scope and spirit thereof.

EXAMPLE I

N-trifluoroacetyl-L-aspartic acid anhydride

L-aspartic acid, 212.8 g. (1.6 mole) is placed in a 2 liter round bottom flask fitted with a stirring motor, dropping funnel, and water condenser. Flask is cooled in a dry ice-acetone bath and trifluoroacetic anhydride, 840 g. (4mole), is added with continuous stirring of the mixture over a period of 45 minutes. Bath is removed and the contents of flask are permitted to warm up. Reaction becomes vigorous at 14°C. with the evolution of heat. After reaction has subsided, the contents of the flask are refluxed for two hours and then cooled to room temperature. The contents of the flask are transferred to a beaker, washed with 1 liter of dry petroleum ether and the product collected. Washing is repeated again with petroleum ether and finally with ether. Finally, the product is pulverized and dried overnight in vacuo at 40°C. Yield: 333 g. (98 percent); m.p. 134°–135°C. ANAL. Calcd. for $C_6H_4NO_4F_3$: C, 34.1; H, 1.9; N, 6.63;

Found: C, 33.4; H, 1.88; N, 6.33.

In a similar manner, using trichloroacetic anhydride, the compound N-trichloroacetyl-L-aspartic acid anhydride is provided.

EXAMPLE II

L-3-(2,2,2-trifluoroacetamido)succinanilic acid

Dissolve N-trifluoroacetyl aspartic acid anhydride, 10.5 g. (0.05 mole) and aniline, 4.6 g. (0.05 mole) in 40 ml. of dry tetrahydrofuran. After standing overnight at room temperature, the solvent is removed and the residue triturated with 200 ml. of 2N HCl. Product is collected and crystallized from acetone-water. Yield: 7.3 g. (48 percent) m.p. 197°–198°C. ANAL. Calcd. for $C_{12}H_{11}N_2O_4F_3$: C, 47.38; H, 3.64; N, 9.20;

Found: C, 47.22; H, 3.86; N, 9.17.

EXAMPLE III

4'-Bromo-3-(2,2,2-trifluoroacetamido)-L-succinanilic acid

Dissolve N-trifluoroacetyl-L-aspartic acid anhydride, 21.1 g. (0.1 mole) and p-bromoaniline, 17.2 g., (0.1 mole) in 300 ml. of dry tetrahydrofuran. After four days at room temperature, the solvent is removed, and the residue is crystallized from 75 ml. of hot acetonitrile. Yield: 18 g. (47 percent); m.p. 200°–202°C. ANAL. Calcd. for $C_{12}H_{10}N_2O_4F_3Br$: C, 37.72; H, 2.63; N, 7.31;

Found: C, 37.31; H, 2.68; N, 7.29.

EXAMPLE IV

L-4'-chloro-3-(2,2,2-trifluoroacetamido)succinanilic acid, dicyclohexylamine salt Dissolve 10.5 g. (0.05 mole) of N-trifluoroacetyl-L-aspartic acid anhydride and 6.4 g., (0.05 mole) of p-chloro-analine in 100 ml. of dry tetrahydrofuran. After standing overnight at room temperature, the solvent is removed. The residue is dissolved in methanol, reacted with 9 g. (0.05 mole) of dicyclohexylamine, and the product crystallized from methanolisopropyl ether. Yield: 9.7 g. (38 percent); m.p. 217°C. with decomposition. ANAL. Calcd. for $C_{24}H_{33}N_3O_4ClF_3$: C, 55.43; H, 6.39; N, 8.08;

FOUND: C, 55.49; H, 6.13; N, 7.99.

EXAMPLE V

4'-Fluoro-3-(2,2,2-trifluoroacetamido)-L-succinanilic acid, dicyclohexylamine salt Dissolve N-trifluoroacetyl-L-aspartic acid anhydride, 10.5 g. (0.05 mole) and p-fluoroaniline, 5.5 g. (0.05 mole) in 100 ml. of dry tetrahydrofuran. After 2 days, the solvent is removed and the oily residue is triturated with ether until crystallization occurs. The product is washed with 200 ml. of 2N HCl, collected, and dissolved in acetone. After the addition of 9 ml. of dicyclohexylamine, water is added until crystallization is initiated. After standing overnight at 4°C., the product is collected and recrystallized from methanol-isopropyl ether. Yield: 8.5 g. (34.2 percent); m.p. 218°C. with decomposition. Anal. Calcd. for $C_{24}H_{33}N_3O_4F_4$: C, 57.24; H, 6.60; N, 8.34;

FOUND: C, 57.20; H, 6.67; N, 8.64

EXAMPLE VI

N-(L-α-carboxyphenethyl)-3-(2,2,2-trifluoroacetamido)-L-succinamic acid, N-methyl ester, dicyclohexylamine salt Dissolve 4.95 g. (0.023 mole) of L-phenylalanine methyl ester HCl in 10 ml. methanol and add 2.32 g. (0.023 mole) of triethylamine to neutralize the hydrochloric acid. Add 200 ml. of ether and cool the mixture to −15°C. After 1 hour, the precipitated triethylamine hydrochloride is collected and discarded. The filtrate is evaporated to remove solvents and the residue is dissolved in 50 ml. of dry tetrahydrofuran. After the addition of 4.85 g. (0.023 mole) of N-trifluoroacetyl-L-aspartic acid anhydride in 25 ml. of dry THF the solution is set aside and allowed to stand at room temperature for 6 days. The solvent is removed and the residue taken up in methanol and reacted with 4.1 g. (0.023 mole) of dicyclohexylamine with ether. The crystalline product is collect and recrystallized from methanol-isopropyl ether. Yield: 6.9 g. (52.7 percent); m.p. 152°–154°C. Anal. Calcd. for $C_{28}H_{40}N_3O_6F_3$: C, 58.83; H, 7.05; N, 7.35;

FOUND: C, 58.83; H, 7.02; N, 7.42.

Similarly, using the appropriate methionine (lower-)alkyl ester or tyrosine (lower)alkyl ester starting material, the following compounds are provided;

N-[L-α-carboxy-3-(methylthio)propyl]-3-(2,2,2-trichloro-acetamido)L-succinamic acid, N-methyl ester, calcium salt;

N-[L-α-carboxy-3-(methylthio)propyl]-3-(2,2,2-trifluoro-acetamido)-L-succinamic acid, N-butyl ester, dicyclohexylamine salt;

N-[L-α-carboxy(p-hydroxyphenyl)ethyl]-3-(2,2,2-trifluoro-acetamido)-L-succinamic acid, N-methyl ester, dicyclohexylamine salt;

N-[L-α-carboxy(p-hydroxyphenyl)ethyl]-3-(2,2,2-trichloro-acetamido)-L-succinamic acid, N-propyl ester, calcium salt.

EXAMPLE VII

N-(L-α-carboxyphenethyl)-3-(2,2,2-trifluoroacetamido)-L-succinamic acid, N-methyl ester Dissolve N-trifluoroacetyl-L-aspartic acid anhydride, 10.5 g. (0.05 mole) and L-phenylalanine methyl ester, 10.8 g. (0.05 mole) in 200 ml. of dry tetrahydrofuran. Let stand 2 days at room temperature, remove the solvent, and crystallize the residue from hot acetonitrile. Yield: 10.5 g. (54 percent); m.p. 150°–152°C. ANAL. Calcd. for $C_{16}H_{17}N_2O_6F_3$: C, 49.23; H, 4.38; N, 7.17;

FOUND: C, 49.30; H, 4.46; N, 7.52.

In a similar manner, using the appropriate starting materials, the following compounds are provided:

N-(L-α-carboxyphenethyl)-3-(2,2,2-trifluoroacetamido)-L-succinamic acid, N-ethyl ester; and N-(L-α-carboxyphenethyl)-3-(2,2,2-trifluoroacetamido)-L-succinamic acid, N-propyl ester.

EXAMPLE VIII

L-3-amino-4'-chlorosuccinanilic acid

Dissolve 7 g. (0.020 moles) of L-4'-chloro-3-(2,2,2-trifluoroacetamido)succinanilic acid in 400 ml. of 1 N $NH_4OH$ and stir reaction for 1 hour. Water is removed in a rotoevaporator to approximately 150 ml. Ph is adjusted to 7 with trifluoroacetic acid and the volume reduced to 100 ml. Crystals form after standing at 4°C. overnight. Yiled: 2 g. (40 percent); m.p. 229°C. with decomposition. ANAL. Calcd. for $C_{10}H_{11}N_2ClO_3$: C, 49.50; H, 4.56; N, 11.54;

FOUND: C, 49.54; H, 4.68; N, 11.58.

EXAMPLE IX

L-3-amino-4'-cyanosuccinanilic acid

L-4'-cyano-3-(2,2,2-trifluoroacetamido)succinanilic acid, 9 g. (0.027 mole) is dissolved in 100 ml. of half-concentrated ammonium hydroxide and stirred for 50 minutes. The solution is subsequently rapidly heated until 85°C. is reached and the flask is removed from the source of heat. Water is removed by means of a rotor-evaporator until a solid residue is obtained. The residue is dissolved in methanol and again taken to dryness. Finally, the residue is refluxed in 70 ml. of n-butanol and the mixture is set aside at room temperature and let stand overnight. The product is collected and dried in vacuo at 40°C. for 3 hours. Yield: 6 g. (92.5 percent); m.p. 215°C. with decomposition. ANAL. Calcd. for $C_{11}H_{11}N_3O_3$: C, 56.65; H, 4.75; N, 18.01;

FOUND: C, 56.45; H, 4.78; N, 18.17.

EXAMPLE X

L-4'-cyano-3-(2,2,2-trichloroacetamido)succinanilic acid, calcium salt

Combine 13 g. (0.05 moles) of trichloroacetyl-L-aspartic acid anhydride and 5.9 g. (0.05 moles) of 4-cyanoaniline in 100 ml. of dry tetrahydrofuran and let stand 5 days at room temperature. Solvent is removed and replaced with 100 ml. methanol. Calcium acetate (0.025 moles) dissolved in 50 ml. water is added. Solution is completed by the slow addition of water. After the removal of methanol and water in a roto-evaporator, the dry residue is crystallized and recrystallized from n-butanol. Yield: 7 g. (35.2 percent); m.p. 226°C. with decomposition. ANAL. Calcd. for $C_{26}H_{18}N_6O_8Cl_6Ca$: C, 39.26; H, 2.28; N, 10.56;

FOUND: C, 39.31; H, 2.52; N, 9.73.

EXAMPLE XI

L-4'-cyano-3-(2,2,2-trifluoroacetamido)succinanilic acid

Combine 21.1 g. (0.1 mole) of trifluoroacetyl-L-aspartic acid anhydride and 11.8 g. (0.1 mole) of 4-cyanoaniline in 200 ml. of dry tetrahydrofuran and let stand 5 days at room temperature. Solvent is removed and residue is crystallized from acetonitrile. Yield: 10.5 g. (32 percent); m.p. 187°–189°C. ANAL. Calcd. for $C_{13}H_{10}N_3O_4F_3$: C, 47.43; H, 3.06; N, 12.76;

FOUND: C, 46.80; H, 3.53; N, 12.87.

What is claimed:

1. L-4'-chloro-3-(2,2,2-trifluoroacetamido)succinanilic acid and the salts thereof with non-toxic, pharmaceutically acceptable bases.

2. A compound, as set forth in claim 1, which is: L-4'-chloro-3-(2,2,2-trifluoroacetamido)succinanilic acid, dicyclohexylamine salt.

\* \* \* \* \*